US009906620B2

(12) United States Patent
Alstad

(10) Patent No.: US 9,906,620 B2
(45) Date of Patent: Feb. 27, 2018

(54) EXTENSIBLE, ASYNCHRONOUS, CENTRALIZED ANALYSIS AND OPTIMIZATION OF SERVER RESPONSES TO CLIENT REQUESTS

(75) Inventor: Kent Alstad, Sechelt (CA)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 12/426,909

(22) Filed: Apr. 20, 2009

(65) Prior Publication Data
US 2009/0276488 A1 Nov. 5, 2009

Related U.S. Application Data

(60) Provisional application No. 61/050,581, filed on May 5, 2008.

(51) Int. Cl.
*H04L 29/08* (2006.01)
*G06F 17/30* (2006.01)

(52) U.S. Cl.
CPC ...... *H04L 67/303* (2013.01); *G06F 17/30902* (2013.01); *H04L 67/2828* (2013.01); *H04L 67/02* (2013.01)

(58) Field of Classification Search
CPC ... H04L 67/303; H04L 67/2828; H04L 67/02; G06F 17/30902
USPC .......................................................... 709/203
See application file for complete search history.

(56) References Cited

U.S. PATENT DOCUMENTS

| 5,564,070 A | 10/1996 | Want |
| 5,784,562 A | 7/1998 | Diener |
| 6,038,601 A | 3/2000 | Lambert et al. |
| 6,370,687 B1 * | 4/2002 | Shimura ........................ 717/146 |
| 6,385,641 B1 * | 5/2002 | Jiang et al. .................... 709/203 |
| 6,457,103 B1 | 9/2002 | Challenger et al. |
| 6,604,143 B1 | 8/2003 | Nager et al. |
| 6,618,751 B1 | 9/2003 | Challenger et al. |

(Continued)

FOREIGN PATENT DOCUMENTS

| NZ | 566291 | 2/2008 |
| WO | 0178334 | 10/2001 |
| WO | 0186494 | 11/2001 |

OTHER PUBLICATIONS

Xue Liu et al., "On-line Response Time Optimization of Apache Web Server", Proceedings of the 11th international conference on Quality of service, 2003, Springer-Verlag, pp. 461-478.*

(Continued)

*Primary Examiner* — Ryan Jakovac
(74) *Attorney, Agent, or Firm* — M&B IP Analysts, LLC

(57) ABSTRACT

An optimizer for messaging systems learns the purpose and context of each message and combines that information with knowledge of the specific client that will be rendering the response, such as a specific HTML browser. Any of a number of optimization factors can be applied, singly or in any combination. Messages are analyzed offline until a configurable threshold is reached, indicating that enough data has been sampled to develop a valid instruction set, to be applied to the responses that a server generates for a particular request. Responses are parsed into tokens and instructions for each type of token are compiled into instruction sets that are stored. These instructions sets continue to be iteratively improved as more data is collected, until the configurable sampling threshold is reached.

47 Claims, 7 Drawing Sheets

(56) References Cited

U.S. PATENT DOCUMENTS

| | | | |
|---|---|---|---|
| 6,839,741 B1 | 1/2005 | Tsai | |
| 7,043,460 B2 | 5/2006 | Deboer et al. | |
| 7,096,418 B1 | 8/2006 | Singhal et al. | |
| 7,139,780 B2 | 11/2006 | Lee et al. | |
| 7,194,522 B1 | 3/2007 | Swildens et al. | |
| 7,266,595 B1 | 9/2007 | Black et al. | |
| 7,295,953 B2 | 11/2007 | Cox et al. | |
| 7,392,294 B2 | 6/2008 | Hellstrom | |
| 7,398,304 B2 | 7/2008 | Smith et al. | |
| 7,469,280 B2* | 12/2008 | Simpson | 709/223 |
| 7,711,854 B2 | 5/2010 | Ecklund et al. | |
| 7,865,585 B2* | 1/2011 | Samuels et al. | 709/223 |
| 7,895,256 B2 | 2/2011 | Zombek et al. | |
| 8,001,175 B2* | 8/2011 | Betancourt et al. | 709/203 |
| 8,788,612 B1* | 7/2014 | Levesque | H04L 67/02 709/217 |
| 2002/0065899 A1 | 5/2002 | Smith et al. | |
| 2002/0156881 A1 | 10/2002 | Klopp Lemon et al. | |
| 2003/0004937 A1 | 1/2003 | Salmenkaita et al. | |
| 2003/0004998 A1 | 1/2003 | Datta | |
| 2003/0040995 A1 | 2/2003 | Daddario et al. | |
| 2003/0065810 A1 | 4/2003 | Ims et al. | |
| 2003/0078964 A1 | 4/2003 | Parrella, Sr. et al. | |
| 2003/0191812 A1 | 10/2003 | Agarwalla et al. | |
| 2003/0204769 A1 | 10/2003 | Coughlin | |
| 2003/0225897 A1 | 12/2003 | Krawetz | |
| 2004/0043758 A1 | 3/2004 | Sorvari et al. | |
| 2004/0117438 A1 | 6/2004 | Considine et al. | |
| 2004/0205165 A1 | 10/2004 | Melamed et al. | |
| 2004/0236824 A1 | 11/2004 | Millington et al. | |
| 2004/0268357 A1 | 12/2004 | Joy et al. | |
| 2005/0021446 A1* | 1/2005 | Whinston | G06Q 30/08 705/37 |
| 2005/0033855 A1 | 2/2005 | Moradi et al. | |
| 2005/0108335 A1 | 5/2005 | Naick et al. | |
| 2005/0138033 A1 | 6/2005 | Katta | |
| 2005/0188048 A1 | 8/2005 | Yuan et al. | |
| 2005/0210243 A1* | 9/2005 | Archard et al. | 713/160 |
| 2005/0261985 A1 | 11/2005 | Miller et al. | |
| 2006/0015512 A1 | 1/2006 | Alon et al. | |
| 2006/0090033 A1 | 4/2006 | Betancourt et al. | |
| 2006/0095527 A1 | 5/2006 | Malik | |
| 2006/0143290 A1 | 6/2006 | Dostert et al. | |
| 2006/0212149 A1 | 9/2006 | Hicken et al. | |
| 2006/0212601 A1* | 9/2006 | Hampton | 709/245 |
| 2006/0224723 A1 | 10/2006 | Chen | |
| 2006/0225065 A1 | 10/2006 | Chandhok et al. | |
| 2006/0235941 A1 | 10/2006 | Areas et al. | |
| 2007/0005603 A1 | 1/2007 | Jain et al. | |
| 2007/0174644 A1 | 7/2007 | Willig | |
| 2007/0180035 A1 | 8/2007 | Liu et al. | |
| 2007/0198716 A1 | 8/2007 | Knowles et al. | |
| 2007/0260748 A1* | 11/2007 | Talkington | 709/246 |
| 2007/0268865 A1 | 11/2007 | Garcia et al. | |
| 2007/0291741 A1 | 12/2007 | Hwang | |
| 2008/0008109 A1 | 1/2008 | Ollis | |
| 2008/0016240 A1 | 1/2008 | Balandin | |
| 2008/0208789 A1 | 8/2008 | Almog | |
| 2008/0208961 A1* | 8/2008 | Kim et al. | 709/203 |
| 2009/0132658 A1 | 5/2009 | Glickstein | |
| 2009/0254707 A1 | 10/2009 | Alstad | |
| 2009/0270076 A1* | 10/2009 | Zhou et al. | 455/414.1 |
| 2009/0276488 A1 | 11/2009 | Alstad | |
| 2011/0295979 A1 | 12/2011 | Alstad et al. | |

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

"Optimize caching". Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Liu et al.; "Online Response Time Optimization of Apache Web Server"; Proceedings of the 11th International Conference on Quality of Service, pp. 461-478; 2003.

Loon et al.; "Alleviating the Latency and Bandwidth Problems in WWW Browsing," USENIX Symposium on Internet Technologies and Systems; Dec. 8-11, 1997, pp. 219-230.

Office Action for the Corresponding Canadian Patent Application No. 2,721,872; Canadian Intellectual Property Office; dated Mar. 6, 2014.

Supplementary European Search Report for the Corresponding European Patent Application No. EP 09741610.1; date of completion of search: Feb. 21, 2014.

Sustersic et al.; "An Analysis of Internet Data Update Behaviors," Proceedings of the 20th International Conference on Advanced Information Networking and Applications (AINA '06); 2006.

Search Report dated Mar. 6, 2014, Canadian Intellectual Property Office, Application No. 2,721,872.

Supplementary European Search Report, date of completion of search Feb. 21, 2014, Application No. EP 09 74 1610.

Examination Report for EP Application No. 09741610.1 dated Dec. 12, 2017 from the European Patent Office, Netherlands.

* cited by examiner

EXTENSIBLE, ASYNCHRONOUS, CENTRALIZED ANALYSIS AND OPTIMIZATION OF SERVER RESPONSES TO CLIENT REQUESTS

CROSS-REFERENCE TO RELATED APPLICATIONS

The present application claims priority from U.S. Provisional Application Ser. No. 61/050,581 for "Reducing Software Application Round Trips and Client Load Times Through Resource Consolidation," filed May 5, 2008, the disclosure of which is incorporated herein by reference.

BACKGROUND OF THE INVENTION

Field of the Invention

The invention generally relates to optimizing messaging systems, and, more specifically, to techniques for asynchronous, centralized analysis and optimization of server responses to client requests in a client/server architecture.

Description of Background Art

As is well known in conventional client/server architectures, clients request content and other resources from servers. Often such requests are transmitted as messages over a network such as the Internet, via various well-known protocols such as TCP/IP and HTTP.

In many cases, messages are transmitted in a manner that is suboptimal, requiring content to be downloaded from multiple sources, and reducing efficiency and performance in other ways. For example, many HTML pages contain links to multiple external resources including, for example JavaScript code, Cascading Style Sheets (CSS), and images in various formats. Developers encapsulate code and data within resources because it promotes reuse, eases maintenance, and allows for common resources to be downloaded once, stored in browser cache and then used on multiple pages. In many cases, upon receiving content containing such links, a client issues a number of additional requests in order to obtain the resources specified by the links on the initial content page.

Many factors can have a negative performance impact on the downloading and rendering of the page. For example, increasing the number of resources used in a page increases the overhead associated with downloading external resources. Each resource must often be requested separately, which increases download times and reduces efficiency. Also, many standard web browsers generally only open a limited number of connections per server (such as two per server), resulting in blocking and waiting. Compounding this problem is the fact that most first time page requests are from browsers that have not previously cached the required resources.

Website authors and developers can improve their applications and content to optimize server responses, for example by reducing resource requests. However, such efforts require such authors and developers to actively modify their code, a process that can be burdensome. In addition, some authors and developers may not be well-versed in the appropriate techniques for improving code performance. Existing systems do not provide any way to automatically modify code to reduce resource requests without requiring developers and authors to modify their applications or content.

Existing attempts to optimize message are often of limited utility. Many conventional messaging system end-points are designed to create, send, receive, and interpret messages for a specific purpose. In most cases these end-points are designed with the specific goals of the end-user in mind and are optimized for this purpose. However, optimization needs often emerge only after an application is already in production, making previous optimization efforts obsolete. In addition, best practices for optimization evolve and must often be applied retroactively, requiring significant effort and expense.

In a public messaging system based on slowly changing standards, each sender and receiver competes for available transport resources using the flags and queues defined by the protocol regardless of purpose. Existing "in-path" acceleration devices generally focus on non-intrusive mechanisms that perform generic, low-level optimizations, such as message compression. Existing methods are often bound by the rules of the slowly changing protocol and are not tailored for understanding and optimizing the more customized application contexts that evolve rapidly as new development techniques are implemented.

What is needed, therefore, is a system and method for optimizing server responses to client requests while minimizing the burden on website authors and developers. What is further needed is an optimization system and method that is extensible and asynchronous, and capable of operating in an automated fashion. What is further needed is an optimization system and method that is appropriate for all messages to which the optimizations are applied, and that is dynamic enough to adapt to changing circumstances. What is further needed is a system and method that provides such advantages without requiring developers and authors to modify their applications or content.

SUMMARY OF THE INVENTION

In various embodiments, the present invention is a system and method for optimizing messaging systems.

The invention may be implemented, for example, as part of a server-side component and/or an in-path device for optimizing application-level operations. In one embodiment, the invention is implemented as a standalone network device, possibly combined with a router. In another embodiment, the invention resides on server hardware and intercepts incoming and outgoing messages to perform the optimization operations described herein. In another embodiment, some components of the invention reside on one or more network devices and other components of the invention reside on one or more servers.

In one embodiment, the system of the present invention learns the purpose and context of each message and combines that information with knowledge of the specific client that will be rendering the response, such as a specific HTML browser. The optimization activities can target load time, reliability, scalability, and/or less obvious factors, such as cultural context or the form factor of the client device.

In various embodiments, the present invention addresses the need to ensure that application-level message optimizations must be appropriate for all messages to which the optimizations are applied. Accordingly, the present invention avoids optimizations that would create changes that violate the original intentions of the application. In various embodiments, the invention uses configurable sampling and analysis strategies to achieve this goal.

In one embodiment, messages are processed, or analyzed, offline until a configurable threshold is reached, indicating that enough data has been sampled to develop a valid instruction set, to be applied to the responses that a server generates for a particular request. Responses are parsed into tokens, and instructions for each type of token are compiled into instruction sets that are stored. These instruction sets continue to be iteratively improved as more data is collected, until a sampling threshold is reached. Each request is evaluated to determine whether a completed instruction set exists for that request. Stored instruction sets are periodically invalidated to support incorporation of application changes.

The techniques described herein provide several advantages over prior art techniques. The system and method of the present invention are extensible because, in one embodiment, an open architecture is used, so as to support development of new types of optimizations as new techniques, technologies and optimization objectives emerge.

In various embodiments, the system and method are asynchronous in their operation, separating the work of applying optimization treatments to messages, which is performed online in real time, from the offline work of analyzing messages and developing new treatments. Configurable settings control the amount of analysis that occurs before creating new treatments and bringing them online.

In various embodiments, the system and method support centralization through the optional location of treatments and analysis on a central network appliance that is separate from the servers generating messages in response to client requests. In other embodiments, optimization components can reside at other locations within the client/server architecture.

Furthermore, the system and method of the present invention are capable of operating without requiring any changes to software that is already running on the system. In various embodiments, message treatments are applied by an independent component that is added to the system and independently updated.

DETAILED DESCRIPTION OF THE EMBODIMENTS

In the examples and drawings presented herein, the present invention is described in connection with performance optimizations for HTTP response messages such as HTML messages served over the Internet. However, one skilled in the art will recognize that the method can also be applied to other forms of optimization and to systems using protocols other than HTTP. In addition, the present invention is described herein as a mechanism for accelerating HTTP network traffic and client rendering of HTML; however, in other embodiments the present invention can be used to achieve other optimization goals.

Architecture

Figure 1:
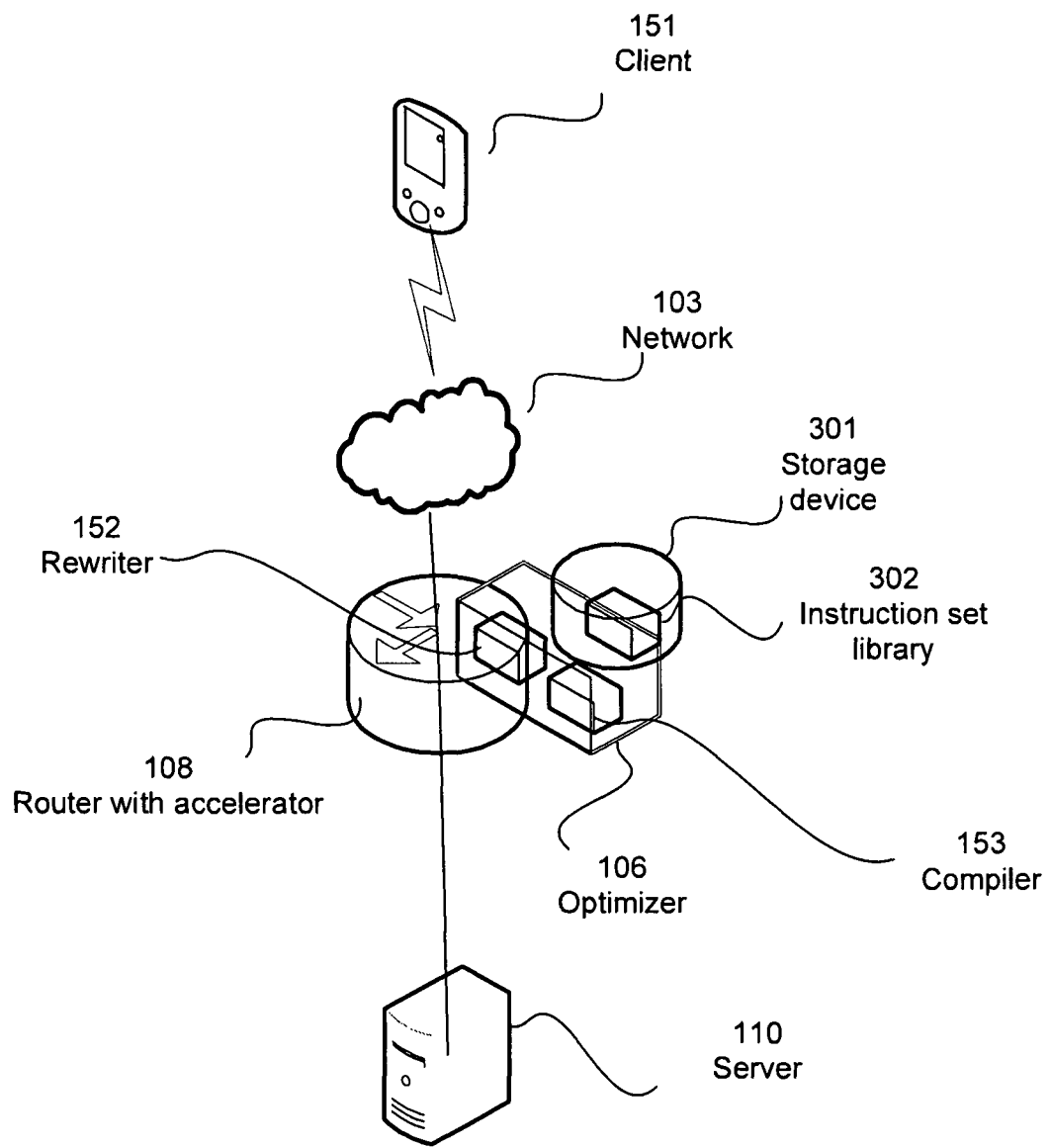
FIG. 1 depicts an architecture for practicing the present invention according to one embodiment, wherein an optimizer resides in a network device.

Referring now to FIG. 1, there is shown an architecture for practicing the present invention according to one embodiment, wherein an optimizer 106 for performing the techniques of the present invention resides in a network device such as router 108. As depicted in FIG. 1, in such a configuration, optimizer 106 is positioned between server 110, which may be an HTTP server, and client 151, which may be an HTTP client such as any electronic device capable of sending and receiving messages on a network 103. Network 103 may be the Internet, or any other network.

In one embodiment, optimizer 106 contains several components, including for example: compiler 153 that creates optimization instruction sets; instruction set library 302 for storage of optimization instruction sets on storage device 301; and rewriter 152 that applies optimization instruction sets to server responses.

Client 151 may run a web browser or other software application for enabling network communications. Client 151 may be a computer or any other electronic device. A non-exhaustive list of examples of user computers includes personal computers, enterprise computing systems, cell phones, handheld devices, personal digital assistants (PDAs), gaming consoles, and portable entertainment systems. One skilled in the art will recognize that any number of devices may be implemented to fulfill the role of client 151 described herein without departing from the scope of the present invention. In one embodiment, client 151 operates under the direction and control of a user, who interacts with client 151 via a user interface according to well-known techniques.

In one embodiment, a classifier is included, for creating indexes, or keys, based on data contained in client requests. These indexes are used to identify optimization instruction sets for purposes of storage and retrieval.

Figure 7:
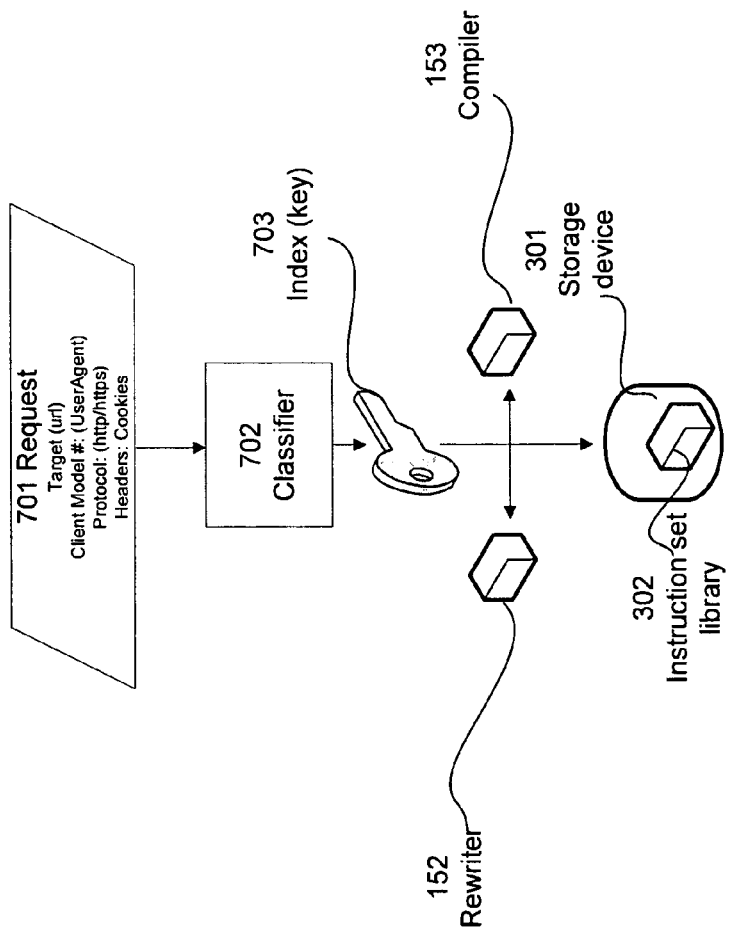
FIG. 7 depicts an architecture for creating indexes based on data contained in client requests, according to one embodiment.

Referring also to FIG. 7, there is shown an example of an architecture including classifier 702 for generating index 703, or key, based on data contained in client request 701. Classifier 702 services both compiler 153 and rewriter 152. Index 703 is used by other optimizer components for storage and retrieval of optimization instruction sets in library 302.

For example, in one embodiment, compiler 153 uses index 703 to create an optimization instruction set for the page/request referred to by index 703, while rewriter 152 uses index 703 to look up the correct optimization to be applied to a current request 701.

Figure 2:
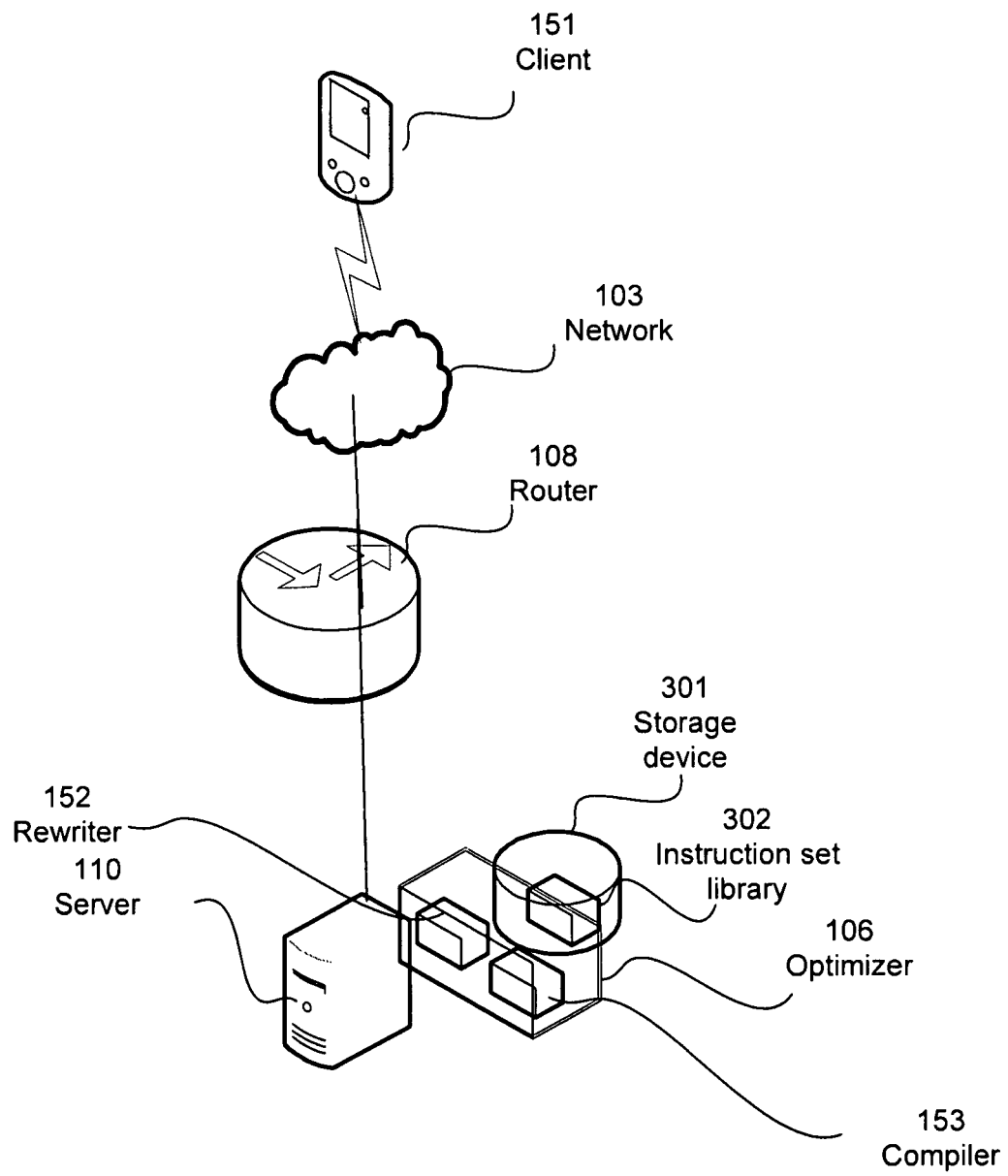
FIG. 2 depicts an architecture for practicing the present invention according to one embodiment, wherein an optimizer resides in a server.

Referring now to FIG. 2, there is shown an alternative architecture wherein optimizer 106 (including compiler 153, rewriter 152, and instruction set library 302) resides in server 110. Optimizer 106 can be configured, for example, to intercept all incoming and outgoing messages at server 110, and to process such messages according to techniques described herein. In this embodiment, optimizer 106 can, for example, be implemented as a server extension or protocol proxy located on server 110.

In any embodiment, the techniques of the present invention can be implemented in an accelerator or any other type of optimizer 106.

Figure 3:
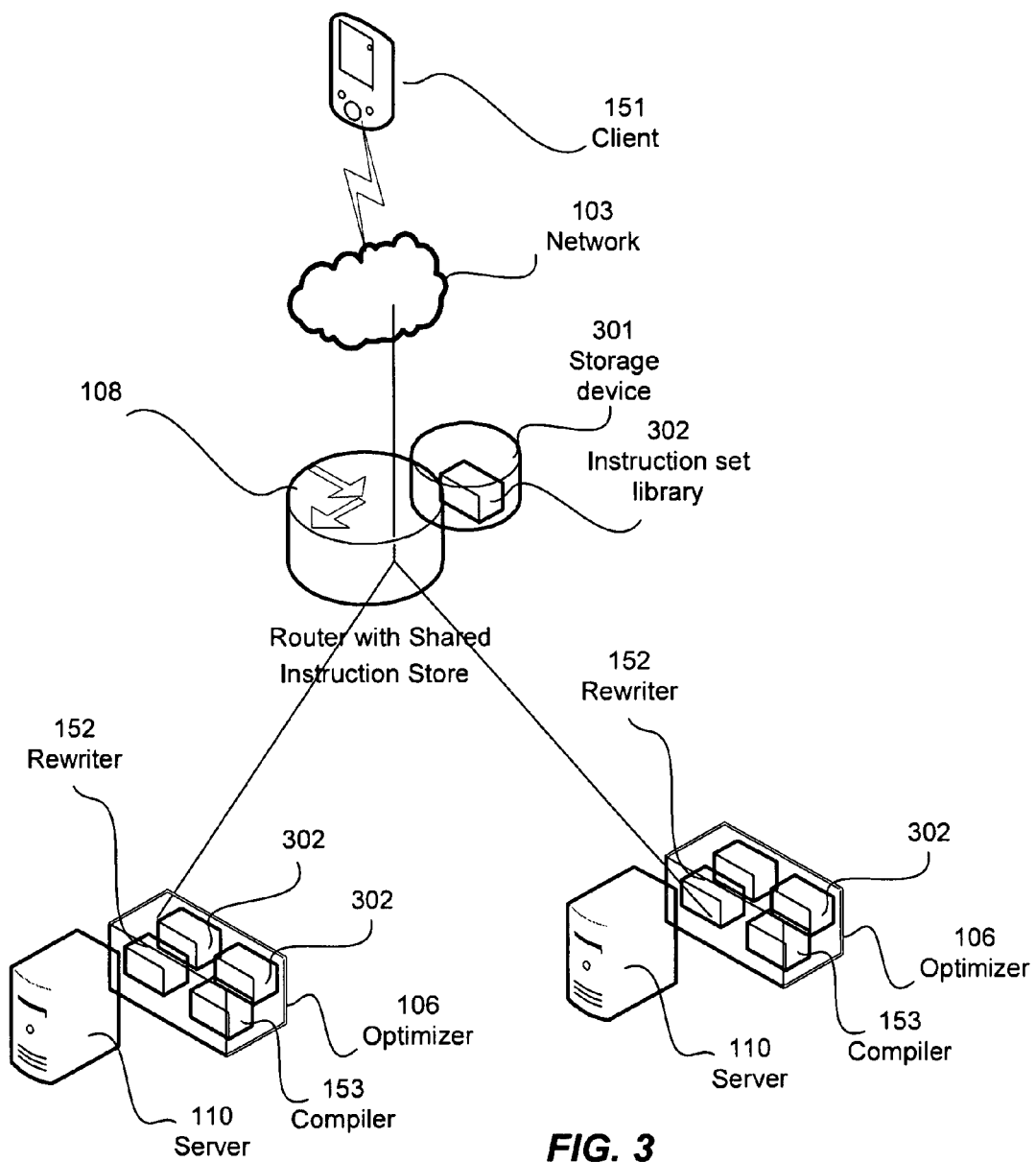
FIG. 3 depicts an architecture for practicing the present invention according to one embodiment, wherein an optimizer resides in servers sharing instruction sets in a cluster.

If desired, the components of optimizer 106 can be separated onto different nodes of the network. The analysis and construction of optimization instructions can be distributed across more than one server 110. For example, referring now to FIG. 3, there is shown an architecture wherein multiple optimizers 106, each containing a compiler 153 and rewriter 152, reside in servers 110, and wherein optimizers 106 make use of a shared instruction set library 302. Instruction set library 302 can be stored, for example in storage device 301 that is available to router 108. Thus, router 108 provides a mechanism for facilitating optimizers' 106 access to shared instructions 302 stored in storage device 301.

In another embodiment (not shown), compiler 153 resides on servers 110, and both rewriter 152 and shared instruction set library 302 reside in a separate network device available to router 108. Classifier 702 can reside on servers 110 and on the network device, or it can reside only on the network device as a shared component.

Method

As discussed above, the present invention provides various techniques for optimizing messaging systems. In one embodiment, messages are analyzed offline until some threshold is reached; the threshold can be user-configurable if desired. In general, the threshold indicates that enough data has been collected concerning analyzed messages, so as to enable the system of the present invention to develop a valid instruction set that can be applied to subsequent responses generated by a server.

In one embodiment, responses are parsed into tokens, and instructions for each type of token are compiled into instruction sets. These instruction sets are then stored for future use. In one embodiment, the stored instructions can be iteratively improved as additional data is collected, until the configurable sampling threshold is reached. Each request is evaluated to determine whether a completed instruction set exists for that request, and stored instruction sets are periodically invalidated to support incorporation of application changes.

In one embodiment, resource-intensive analysis and instruction generation activities, performed by compiler 153, take place offline, so as to have minimal or no impact on foreground server loads. Analysis and instruction generation tasks can be queued and completed in controlled conditions such that priority is given to foreground traffic processes.

Figure 4:
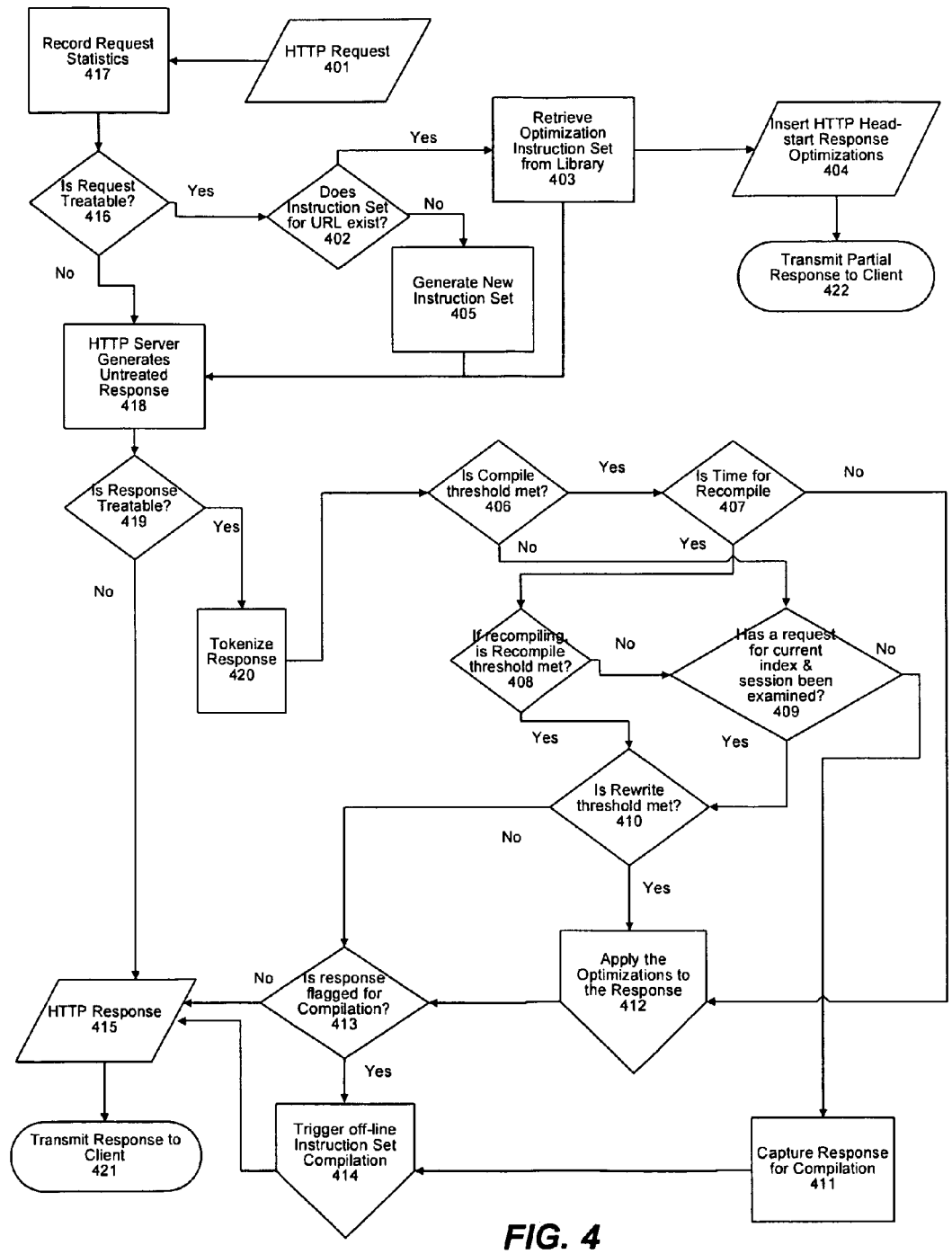
FIG. 4 is a flow diagram depicting a method for processing messages according to one embodiment.

Referring now to FIG. 4, there is shown a flow diagram depicting a method for processing messages according to one embodiment of the present invention. For illustrative purposes, FIG. 4 depicts the method in the context of an HTTP request that is processed according to various steps for analysis and optimization, resulting in an HTTP response in the form of HTML text. One skilled in the art will recognize that such an application is illustrative, and that the techniques of the present invention can be applied to other types of request/response transactions. In addition, in the description that follows, many of the steps of FIG. 4 are performed by optimizer 106; however, one skilled in the art will recognize that some or all of the steps can be performed by any other components.

An HTTP request 401 is intercepted by the system prior to reaching its destination HTTP server 110. For example request 401 can be intercepted by compiler 153, which, as described above, can reside in router 108, server 110, or in any other location along the communication path.

Compiler 153 records 417 request statistics, which includes data to be used by instructions when compiling instructions as part of the optimization, as described in more detail below, in connection with item 543 of FIG. 5.

Compiler 153 determines 416 whether request 401 is treatable, i.e. suitable for analysis. For example, some domains may be flagged for treatment while others are not; thus, if the resource is being requested on a domain not flagged for treatment, the request can be excluded from the analysis. In this manner, the system of the present invention is able to weed out traffic that causes errors, cannot be optimized, and/or is flagged to be excluded in the system configuration by an administrator.

If, in step 416, it is determined that request 401 is not treatable, the system proceeds directly to step 418, wherein server 110 generates 418 an untreated (i.e., unaltered) response.

If, in step 416, it is determined that request 401 is treatable, compiler 153 determines 402 whether an instruction set for the requested URL exists. In one embodiment, this step is performed by creating index 703, which identifies request 401, as described in more detail in connection with element 500 of FIG. 5. In one embodiment, as described above in connection with FIG. 7, index 703 is generated by an additional component of the optimizer, referred to as classifier 702, which services other components of the system. Any data in the request, including, for example, URL, HTTP headers, or the like, can be incorporated into index 703.

In one embodiment, instruction sets are stored in instruction set library 302 along with indexes 703, allowing requests to be matched with instruction sets.

In step 402, the system checks whether a stored instruction set exists for index 703 corresponding to request 401. If, in step 402, index 703 is found in the library of stored instruction sets, optimizer 106 retrieves 403 the stored instruction set from the library. In addition, rewriter 152 can optionally transmit preparation data to client 151 prior to the untreated response being generated by server 110. This can be advantageous in some situations, by reducing end user latency incurred while server 110 response is being created. If it is deemed useful to perform this step, rewriter 152 inserts 404 head-start response optimizations where possible, and transmits 422 a partial response to client 151 including the head-start portion of the HTTP response. In one embodiment, this is accomplished using a content-encoding: chunked header directive. Specific examples of optimizations are discussed below.

If, in step 402, the index is not found in the library of stored instruction sets, compiler 153 generates 405 a new instruction set and stores it in library 302. In one embodiment, this new instruction set is designated as a default, or "$0^{th}$ generation", instruction set, appropriate for treating the particular content-type of the response. Configuration data is used to map content-types to default instruction sets. A configuration file can be provided, specifying, for each content-type, one or more corresponding instruction type(s) to be added to the default instruction set. If no instruction types are specified, the content-type is not treated. For example, a system configured to optimize HTML might include different default instruction sets configured for various content-types (text/HTML, text/CSS, and the like), each with metadata describing the instruction types to be added to the set.

Server 110 generates 418 its untreated response. In one embodiment, the system of the present invention intercepts all responses, and either passes them through untreated, or rewrites them by applying an instruction set. In another embodiment, the system only intercepts those responses for which an instruction set is specified including at least one instruction type.

For each untreated response, compiler 153 determines 419 whether the response is treatable. In one embodiment, this is accomplished by examining the response content to determine whether it warrants further inspection and/or rewriting, or should be excluded from further processing.

If, in step 419, compiler 153 determines that the response is not treatable, response 415 is transmitted 421 to client 151 without further processing.

If, in step 419, compiler 153 determines that the response is treatable, compiler 153 tokenizes 420 the response. In one embodiment, this is performed by using language pattern matching algorithms to parse text in the response into predefined response token type categories. The system uses this abstract categorization system to determine which tokens are of interest to a given instruction type. In one embodiment, the meaning and application of each token type classification is unique to the message content-type being optimized. For example, a different token type set would be used for text/CSS as opposed to text/HTML.

Once the response has been tokenized 420, compiler 153 determines 406 whether the compile threshold has been met. In one embodiment, this is deemed to have occurred when the process thresholds (as described in more detail below) for all instructions within the set have been reached.

If, in step 406, the compile threshold is met, optimizer 106 determines 407 whether it is time to recompile the response. Since message content can change over time, it is often useful to establish a cycle in which fully compiled instruction sets are periodically recompiled to reflect the new message content. In one embodiment, each instruction set begins the recompilation phase when some time interval (which may be predefined or configurable) has elapsed since the most recent occurrence of the compile threshold being met 406. Thus, if the current date/time is not greater than the date/time of the most recent occurrence of the compile threshold being met plus the recompile time interval, then optimizer 106 proceeds to step 412 where rewriter 152 applies optimizations; otherwise, optimizer 106 proceeds to step 408 where compiler 153 determines whether a recompile process threshold has been met.

In one embodiment, the system of the present invention is able to determine which parts of a response can safely be modified. To achieve this, compiler 153 samples a number of different responses to the same request, so as to be able to determine which sections of the responses remain constant. In one embodiment, compiler 153 samples some number of request-response pairs, and can also sample some number of requests that differ only by client session. Different clients making the same request can often receive different responses; however, in many cases, some sections will be common among the different response, and therefore suitable for optimization.

In one embodiment, the system of the present invention establishes a "process threshold", which is a configuration setting that determines how many different client sessions should be mined for optimizations prior to stopping the inspection process. After the process threshold is reached, no additional requests with that instruction index are inspected for optimizations until the recompile interval has elapsed, at which time evidence gathering resumes.

In one embodiment, each instruction in an instruction set has its own process threshold, which may be the same or different than process thresholds for other instructions. Analysis continues until the process threshold is reached for each instruction met, indicating that the compile threshold is now met. In general, analysis is performed only for instructions within the set whose process threshold has not yet been reached.

If, in step 406, the compile threshold is not met, or if, in step 408 when recompiling, the recompile threshold is not met, then compiler 153 determines 409 whether a request for the current index and session has already been examined. In one embodiment, in order to ensure that optimizations apply across clients/users, the system uses request cookies (or other unique session identifiers) to determine whether a request for the current instruction index for the current session has already been examined. This helps to ensure that the requests chosen for inspection represent enough of the user population so as to ensure general applicability of the optimizations.

If, in step 409, compiler 153 determines that the user session has not been processed, optimizer 106 proceeds to step 411. Here, compiler 153 captures 411 the original HTML, for example in an unaltered byte array, so that it can be parsed into tokens and analyzed offline to compile an instruction set.

If, in step 408, the recompile threshold has been met, or in 409, the user session has already been processed, compiler 153 proceeds to step 410. Here, compiler 153 determines 410 whether a rewrite threshold has been met. In one embodiment, the rewrite threshold is a configuration setting that determines how many different client/user sessions should be encountered before the optimizations in the current instruction set are applied. This threshold can be lower than the compile or recompile thresholds, indicating that rewriting can begin while analysis and further refinement of the instruction set continues. If the rewrite threshold has been met, rewriter 152 applies 412, to the response, the optimizations defined by the instruction set for this request. These optimizations are also applied 412 when the compile threshold is met 406 and it is not time for a recompile 407. The process of applying optimization instruction sets, which is also called rewriting, is described in more detail in connection with FIG. 6.

Compiler 153 then determines 413 whether the response is flagged for compilation. In one embodiment, during the pre-process and process events (as described below in connection with FIG. 5), each instruction is given the opportunity to request compilation. This may be done, for example, in response to new data being encountered, so that the new data can be incorporated into the optimization instruction set. If, in step 413, any instruction within the instruction set has requested compilation by the time request processing is complete, compiler 153 triggers 414 off-line compilation of the instruction set.

In one embodiment, step 414 involves initiating a new asynchronous offline task to compile the instruction set. Response tokens flagged during compile are transformed into useable optimizations that can be applied later to a response stream in the foreground. This process is further described below in connection with FIG. 5.

Compilation can be a processor intensive task. In order to minimize the performance impact, in one embodiment the system ensures that only one instance of an instruction set stored in the instruction library is compiling at any given time, and that all compilation occurs asynchronously to the main response processing. In one embodiment, compilation is performed iteratively to incorporate new data into the instruction set as new request-response pairs are processed.

The HTTP response 415 is then transmitted 421 to client 151, across communications network 103. Response 155 is an intercepted HTTP response that may or may not have been examined and/or rewritten by rewriter 152, as described above.

Figure 5:
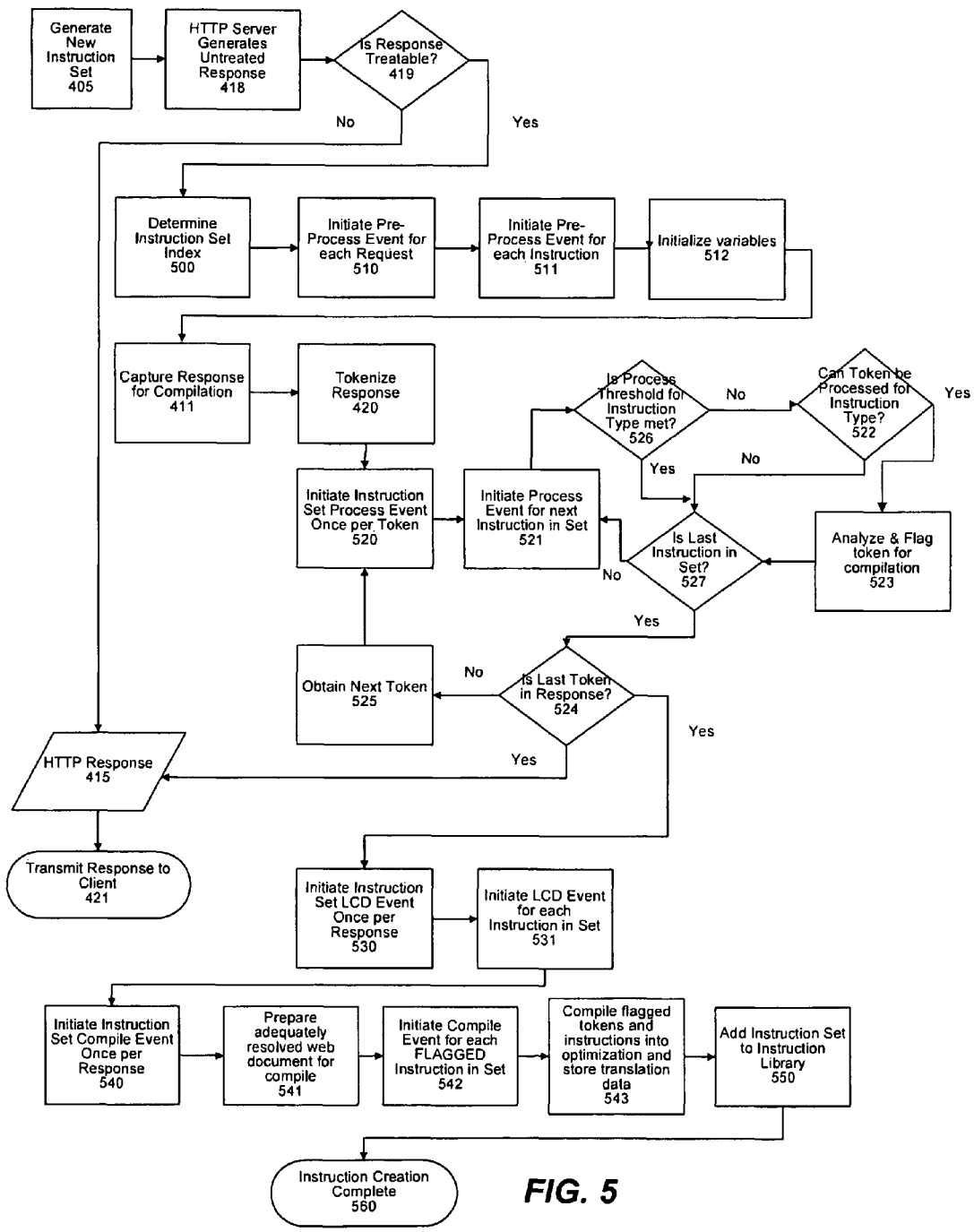
FIG. 5 is a flow diagram depicting a method for creating optimization instruction sets according to one embodiment.

Referring now to FIG. 5, there is shown a flow diagram depicting a method for creating optimized instruction sets according to one embodiment. FIG. 5 depicts a particular methodology for the process initiated in step 414 of FIG. 4, in which the compilation of the optimized instruction set is initiated. As will be seen, according to the method of FIG. 5, compiler 153 creates optimized instruction sets as part of an offline process.

FIG. 5 also depicts the interrelationship between some steps of FIG. 4 and the mechanism for creating optimized instruction sets. Accordingly, some steps of FIG. 4 are shown again in FIG. 5.

In one embodiment, the process of creating optimized instruction sets is performed iteratively, so as to create customized instruction sets based on parsing and analyzing responses to multiple requests that share an instruction index. Each type of instruction in an instruction set performs specialized processing of the tokens parsed from each processed response. Based on this iterative processing, instructions are then compiled into the instruction set, as described in more detail below.

In one embodiment, the system of the present invention ensures that, for at least some types of instructions, rewriter 152 only modifies response tokens that are seen to occur across requests from different users. By limiting processing to such tokens, the system of the present invention avoids expending resources in creating and applying treatments for portions of the response that are unlikely to benefit from optimization due to their variability.

As discussed above in connection with FIG. 4, if the index for a request is not found in the library of stored instruction sets, compiler 153 generates 405 a new instruction set and stores it in the library. Server 110 generates 418 an untreated (i.e., unaltered) response, and compiler 153 determines 419 whether the response is treatable, for example by examining the response content to determine whether it warrants further inspection and/or rewriting.

If, in step 419, compiler 153 determines that the response is not treatable, response 415 is transmitted 421 to client 151 without further processing.

If, in step 419, compiler 153 determines that the response is treatable, compiler 153 determines 500 the instruction set index, for example by invoking classifier 702 shown in FIG. 7. This may be done, for example, by identifying a unique key that serves as an instruction library index for pairing optimization instruction sets with the requests. In addition to URL-based request information, it is possible to use any part of the request data, including request headers, to construct the key for the instruction index.

Once the instruction set index is determined 500, compiler 153 initiates a pre-process event 510. In one embodiment, this pre-process event occurs once per request, allowing request-level variables to be initialized. Then, if applicable, compiler 153 iterates through each instruction in the set, initiating 511 a pre-process event for each instruction. In one embodiment, these pre-process events are used to initialize variables; alternatively, variable initialization 512 can be a separate step, including the initialization of customized data structures if appropriate. For example, an optimization may need a data structure to record tokens encountered in previous requests and compare them with tokens encountered in the current request. More detailed optimization examples appear below.

Compiler 153 then captures 411 and tokenizes 420 the response, as described above in connection with FIG. 4.

Next, compiler 153 initiates 520 an instruction set process event, once per token. In this step, an instruction set process event is called once for each token encountered during the tokenizing operation of step 420. This event in turn manages an iteration loop (steps 521 through 527) through each of the instructions in the set, giving each instruction an opportunity to examine (i.e., process) each token. In one embodiment, the process event is used only for analysis, so that no changes are made to the response.

Compiler 153 initiates 521 a process event for the next instruction in the set. This includes retrieving the next instruction contained in the current instruction set, in the order in which the instructions were added to the instruction set.

Compiler 153 then determines 526 whether a process threshold for the instruction type has been met. As described above in connection with step 408 of FIG. 4, a process threshold is a configuration setting that determines how many different client sessions should be mined for optimizations prior to stopping the inspection process. In step 526, compiler 153 compares, for each instruction, the number of client/user sessions processed by the current instruction set with a process threshold configuration value for the instruction.

If, in step 526, the process threshold has not been met, compiler 153 determines 522 whether the particular type of token being processed can be optimized for the given instruction type. In one embodiment, only certain types of tokens can be optimized for each instruction type. For example, when processing HTML, tokens can correspond to HTML tags, and a cascading style sheet (CSS) consolidator can be constructed so that it can only optimize HTML <link> tokens. In such an example, compiler 153 in step 522 would determine whether the token being processed is of a type that can be optimized by the CSS consolidator.

If, in step 522, the token type can be optimized for the instruction type, compiler 153 analyzes 523 and flags the token for compilation. A result of this step is that each instruction compiles a list of tokens that can be optimized later during compilation. In one embodiment, this step is performed offline, thereby avoiding any significant impact on performance.

Compiler 153 determines 527 whether the current instruction is the last instruction in the instruction set. If not, it returns to step 521 to initiates a process event for the next instruction in the set.

If, in step 527, the current instruction is the last instruction in the instruction set, compiler 153 determines 524 whether the current token is the last token in the response. If not, compiler 153 obtains 525 the next token, for example by signaling a parser to advance to the next token in the response stream.

If, in step 524, the current token is the last token in the response, compiler 153 proceeds to transmit 421 response 415 to the client.

Compiler 153 also initiates an off-line process to create optimized instruction sets; this can be done in parallel with transmission 421 of response 415 to the client. Compiler 153 begins by initiating 530 a "least common denominator" (LCD) event for each response and for each instruction in the instruction set 531. The term "LCD event" refers here to an analysis that identifies content elements common to a configurable number of responses and users. This analysis enables the system of the present invention to focus its optimizations on those portions of responses that are not highly variable, and are therefore likely to be applicable to a wide variety of responses. For example, web pages often contain some content that is common to all users and some content that is customized for each user based on the user's name, locale, purchasing history, and the like. By performing LCD analysis, the system of the present invention can focus certain of its optimization efforts on the content common to all users. Other optimizations, represented by other instructions in the instruction set, can be applied more broadly to include content that varies for each user.

In one embodiment, in step 531, compiler 153 performs LCD analysis as follows. For each instruction that implements an optimization that relies on elements that are common to two or more users, compiler 153 compares data gathered during each instruction's process event for each token with data gathered during processing of previous responses to requests from other users. Data elements that are not common to both are eliminated. Thus, the system of the present invention helps to ensure that only content common to two or more users is optimized. In other embodiments, only data common to at least some number of users is optimized, where the number can be predetermined or configurable. Furthermore, the LCD analysis can be performed with respect to entities other than users, so that compiler 153 can seek data elements common to a plurality of entities, where each entity may or may not represent an individual user.

Once per response, compiler 153 initiates 540 an instruction set compile event. In this manner, compiler 153 manages the creation of a compilation environment for the instruction.

Next, optimizer 106 prepares 541 an object model representing the response as it will be rendered by client 151. In one embodiment, this is done by capturing the original HTML, as described above in connection with step 411, to obtain a document object model (DOM) that simulates the essential elements of the expected rendered content at client 151. This DOM can be queried during compilation to help ensure that each optimization is being applied correctly. For example, in one embodiment the DOM is represented as XML, and XPath queries are used to extract data needed for compilation.

Optimizer 106 then initiates 542 a compile event for each instruction in the instruction set. To do this, optimizer 106 iterates through each instruction in the instruction set, initiating each instruction's compile event. In one embodiment, only those instructions are compiled that were flagged during the process event as pertaining to a token that should be treated, in order to avoid unnecessary processing.

Optimizer 106 then compiles 543 flagged tokens and their instructions into optimizations. In this manner, optimization data in the form of an instruction set is derived for further use.

The instruction set is then added 550 to instruction set library 302. In one embodiment, the instruction set is stored along with an instruction index 703 derived from request 701, as shown in FIG. 7.

The new instruction set is now complete 560, and is ready to be used for rewriting responses, as described in connection with FIG. 6.

Figure 6:
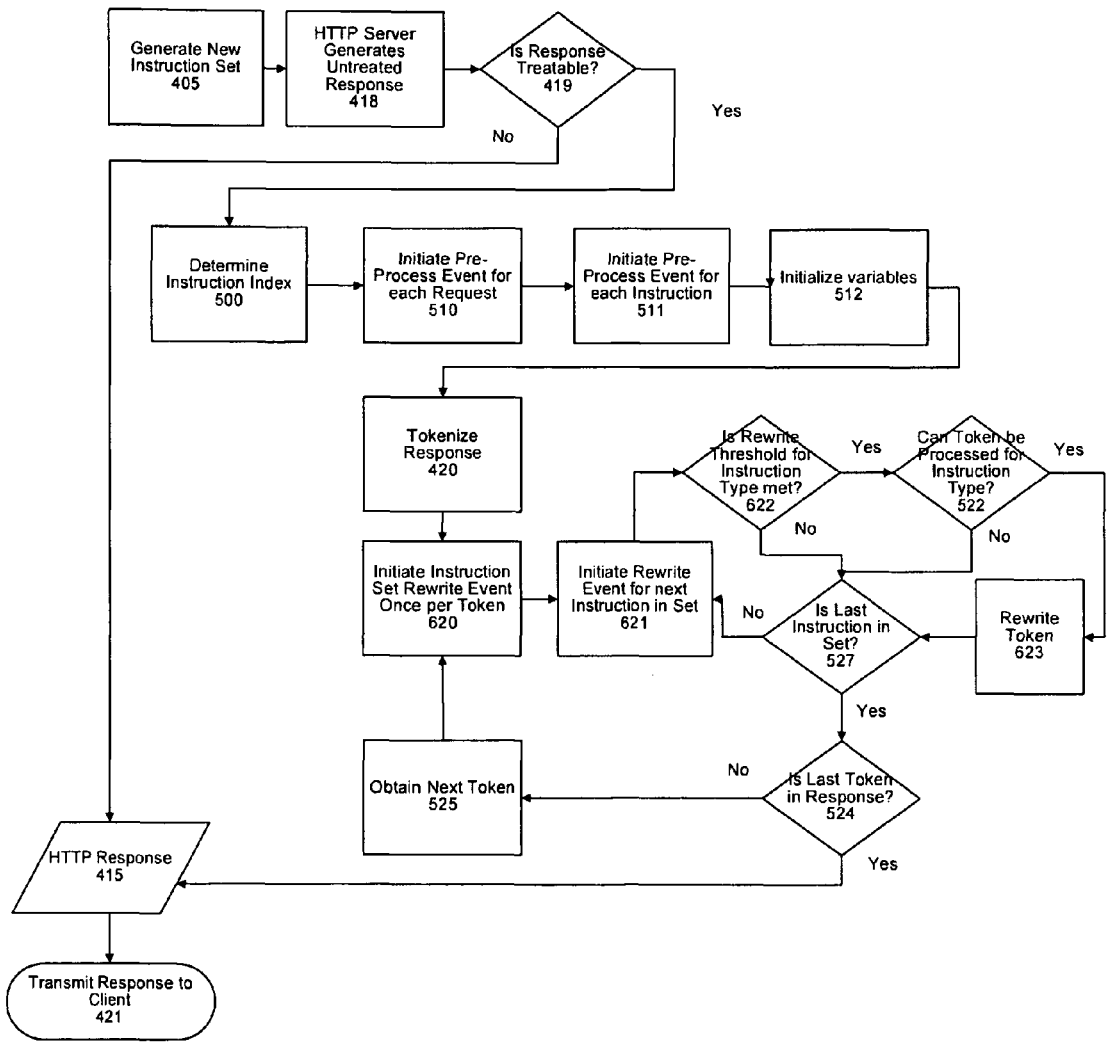
FIG. 6 is a flow diagram depicting a method for applying saved instruction sets to optimize a response, according to one embodiment.

Referring now to FIG. 6, there is shown a flow diagram depicting a method for applying saved instruction sets to optimize a response, according to one embodiment. FIG. 6 depicts a particular methodology for the process initiated in step 412 of FIG. 4, in which the process of applying optimizations is initiated.

FIG. 6 also depicts the interrelationship between some steps of FIG. 4 and the mechanism for creating optimized instruction sets. Accordingly, some steps of FIG. 4 are shown again in FIG. 6.

In one embodiment, the steps of FIG. 6 are performed by optimizer 106, as described herein. In another embodiment, another component may perform these steps. For illustrative purposes, the method will be described in the context of optimizer 106 performing the steps.

As discussed above in connection with FIG. 4, if the index for a request is not found in the library of stored instruction sets, compiler 153 generates 405 a new instruction set and stores it in the library. Server 110 generates 418 an untreated (i.e., unaltered) response, and compiler 153 determines 419 whether the response is treatable, for example by examining the response content to determine whether it warrants further inspection and/or rewriting.

If, in step 419, compiler 153 determines that the response is not treatable, response 415 is transmitted 421 to client 151 without further processing.

If, in step 419, compiler 153 determines that the response is treatable, optimizer 106 performs steps 500, 510, 511, 512 and 420 as described above in connection with FIG. 5.

Once the response has been tokenized 420, optimizer initiates 620 an instruction set rewrite event for each token. Rewriter 152 iterates through each of the tokens parsed from the response and through each of the instructions contained in the instruction set, initiating each instruction's rewrite event for each token, so as to apply the optimizations specified by the rewrite events.

Rewriter 152 initiates 621 a rewrite event for the next instruction in the instruction set.

Then, rewriter 152 determines 622 whether a rewrite threshold has been met. As discussed in connection with step 410 of FIG. 4, the rewrite threshold is a configuration setting that determines how many different client/user sessions should be encountered before the optimizations in the current instruction set are applied. For each instruction, rewriter 152 compares the number of client/user sessions processed for the current instruction set with a rewrite threshold configuration value. Rewriting can begin while processing is still ongoing. As new requests are processed by the compiler and additional rewrite thresholds are achieved, the instruction set is modified and rewriter 152 can expand the scope of its efforts.

If, in step 622, the number of sessions is greater than or equal to the threshold value, rewriter 152 determines 522 whether the token type being processed can be optimized for the given instruction type. If so, rewriter 152 rewrites 623 the token, by using the optimization data to generate an optimized token. Examples of particular types of optimization are described below.

If, in step 622, the rewrite threshold has not been met, or if, in step 522, the token is not of a type that can be processed for the instruction type, the token is not rewritten.

Rewriter 152 determines 527 whether the current instruction is the last instruction in the instruction set. If not, it returns to step 621 to initiates a rewrite event for the next instruction in the set.

If, in step 527, the current instruction is the last instruction in the instruction set, rewriter 152 determines 524 whether the current token is the last token in the response. If not, rewriter 152 obtains 525 the next token, for example by signaling a parser to advance to the next token in the response stream.

If, in step 524, the current token is the last token in the response, rewriter 152 proceeds to transmit 421 response 415 to the client.

In one embodiment, a configurable threshold, or timeout condition, can be established for at least one instruction set. When the threshold or timeout condition is met, the instruction set is expired: either it is deleted, or it is flagged as expired. A new rewrite threshold can be established, and new analysis and recompilation is triggered.

Optimization Examples

The following are descriptions of several examples of optimizations that can be accomplished using the techniques of the present invention. One skilled in the art will recognize that these examples are provided for illustrative purposes, and that many other types of optimizations can be accomplished.

HTTP Response Optimizer

In one embodiment, the method of the present invention can be used to optimize HTML text responses transmitted over the HTTP protocol. The instruction types used in this optimization have the goals of reducing browser load time and increasing server throughput.

Various instruction types can be implemented to perform such optimizations. In one embodiment, an instruction base class is established, with several instruction types, also referred to as treatments, that specialize the instruction base class to perform optimizations for various types of HTML content.

Examples of such instruction types include, without limitation: a CSS Consolidator; an Image Consolidator; a JavaScript Consolidator; a Domain Connection Maximizer; a Reference Optimizer; a Resource Preloader Predictive Browser Caching (PBC) Optimizer; a Response Head Start instruction type; and a JavaScript Deferral instruction type. Each of these examples will be described in turn.

CSS Consolidator:

In one embodiment of the present invention, an instruction can be created using the methods described above, such that multiple references to external cascading style sheets (CSS's) on a given page can be consolidated into a new single external reference containing their amalgamated contents. Such consolidation serves to reduce the total number of individual requests.

In one embodiment, in an implementation where compiler 153 is processing a CSS Consolidator instruction, step 523 (Analyze & Flag token for compilation) is performed by analyzing each token and determining whether or not it represents an external link to a CSS file.

Step 543 (Compile flagged tokens and instructions into optimization and store translation data) is performed by analyzing each flagged token to determine if it is suitable for consolidation. If so, the associated CSS file is fetched and appended to the new consolidated CSS file. This information is then stored in the instruction to be used in rewrite step 623.

Rewrite step 623 is performed by analyzing each token and determining if it was one identified in compile step 543. If so, the token is replaced with empty data, to prevent the loading of that CSS resource. A single link to the file containing the consolidated CSS is added to the rewritten page.

Image Consolidator:

In one embodiment of the present invention, an instruction can be created using the methods described above, such that some or all of the images used on a page are consolidated into a single set of images called an image sprite. The HTML can then be rewritten to include CSS styles that place the image in the correct location by use of the CSS background property. Such consolidation serves to reduce the total number of requests per page because a single image sprite contains some or all of the original images on the page.

In one embodiment, in an implementation where compiler 153 is processing an Image Consolidator instruction, in step 523 (Analyze & Flag token for compilation) no inline analysis is performed. Instead, a copy of the HTML response obtained in step 411 is analyzed asynchronously offline. Step 543 (Compile flagged tokens and instructions into optimization and store translation data) is performed by constructing an HTML/CSS Document Object Model (DOM) from the captured HTML Response from step 411. This HTML DOM is queried to obtain all the HTML tags that are either images or have background images. These tags are analyzed to determine if they are acceptable for consolidation by inspecting the height, width and/or other CSS properties of the tag. The images for the acceptable tags are retrieved, for example from local storage or from a network source, and are consolidated into an image sprite or set of image sprites depending on the CSS layout and image types. A CSS Style is computed for each acceptable tag and its associated image sprite. This style replaces the original image with the one in the image sprite; in one embodiment this replacement is done using the CSS background property. A background-url value represents a URL to the image sprite and a background position value represents the location of the original image in the image sprite. This computed information is stored in the instruction so that it can be used in rewrite step 623.

Rewrite step 623 is performed by analyzing each token and comparing it to the information stored in the instruction. If the token is one of the tags for which the Image Consolidator has a consolidated image, the token is rewritten. If the tag is a foreground image tag, the Image Consolidator replaces the original image source in the tag with a transparent image. Regardless of tag type (foreground or background) the Image Consolidator then adds the CSS style to the tag so that the image sprite displays the correct image as a background image. The resulting rewritten HTML has links to the image sprite(s) and not the original images it replaced, thus reducing the total number of requests on the page and accelerating page load time, while preserving the appearance of the rendered page.

JavaScript Consolidator:

In one embodiment of the present invention, an instruction can be created using the methods described above, such that two or more references to external JavaScript source code files on a given page can be consolidated into a single external reference containing some or all of their individual contents. Such consolidation serves to reduce the total number of individual resource requests.

In one embodiment, in an implementation where compiler 153 is processing a JavaScript Consolidator instruction, step 523 (Analyze & Flag token for compilation) is performed by analyzing each token and determining whether or not it represents an external link to a JavaScript file. In one embodiment such an external link is defined by a script element with a "src" attribute.

Step 543 (Compile flagged tokens and instructions into optimization and store translation data) is performed by analyzing each flagged token to determine if it is suitable for consolidation. If so, the resources linked to by that token are fetched and further analyzed. The JavaScript Consolidator takes into account the fact that, in normal operation, the web browser typically downloads and interprets JavaScript resources immediately in place. Accordingly, the JavaScript Consolidator ensures the semantic validity of the consolidated JavaScript code, for example by splitting the JavaScript code into moveable and immoveable portions. In one embodiment, the moveable parts are appended to the new consolidated JavaScript file, while the immoveable parts are left as a string in the instruction to be inserted in rewrite step 623.

Rewrite step 623 is performed by analyzing each token and determining if it was one identified in the compile step. If so, the token is replaced with the immoveable portion of the associated JavaScript file. A single script element pointing to the consolidated JavaScript file is added to the rewritten page.

Domain Connection Maximizer:

In one embodiment, the Domain Connection Maximizer (DCM) corrects a common client browser deficiency that results in too few concurrent connections. Many client browsers default to creating two client connections per domain. This is not optimal, because most browser load times benefit from opening more connections to improve the concurrency of embedded resource downloads. DCM introduces more domains so that the browser opens more concurrent connections, resulting in shorter page load times.

In one embodiment, in an implementation where compiler 153 is processing a DCM instruction, step 623 (Rewrite Token) is performed by rewriting all resource references embedded in text/HTML and text/CSS content-type streams to use a URI stem designated as a "maximized" URI stem. A maximized URI stem is one that has been modified to increase the number of concurrent connections by making use of a additional domains. Because connections are opened on a per-domain basis, adding domains increases the number of connections. Requests to the added domains are redirected to the original. If a resource is referred to by relative path, the path is transformed into its absolute path equivalent, including the maximized stem (e.g., http://domain2/localpath/resource.gif).

In one embodiment, in order to perform domain maximization the domain being maximized has a fixed number of "maximized" domain names defined in the configuration (e.g. www1, www2, www3) by the system administrator. These domains are registered with a recognized domain authority so that traffic requests for the maximized domains are redirected back to the original domain (i.e. www1.domain.com resolves to the domain.com IP address).

In one embodiment, to arrive at a viable maximized domain transform, a deterministic algorithm is applied to the URL that places the URL into one and only one of the maximized URL domains. For example, a hashing scheme can be used to create a relatively even distribution of resource URLs across a predefined number of maximized domains.

Once the domain to be used has been determined, the new maximized domain URI stem is substituted for the original URI stem.

Reference Optimizer:

In one embodiment of the present invention, an instruction can be created using the methods described above, such that references embedded in an HTML or CSS HTTP response are aliased so as to optimize the client browser's treatment of the embedded resource request. Two possible classes of reference optimizations are: 1) image size and format transformations that improve the download and render time of the resource; and 2) the addition of browser cache headers that signal the browser to keep the resource in the local cache for later use. One skilled in the art will recognize that these particular types of reference optimizations are merely exemplary. In one embodiment, the system of the present invention aliases and monitors the original actual resources, so that if a resource changes, compiler 153 is notified and the instruction is updated and recompiled.

In one embodiment, in an implementation where compiler 153 is processing a JavaScript Consolidator instruction, step 523 (Analyze & Flag token for compilation) is performed by analyzing each token and determining whether or not it contains embedded reference links that can be optimized to improve cacheability and/or size. If a token is suitable for optimization, the links are flagged for compilation into the instruction.

Step 543 (Compile flagged tokens into optimization and store translation data) is performed by evaluating each embedded link flagged for compilation, in order to determine its suitability for optimization. In one embodiment, the evaluation criteria include any or all of: 1) ensuring the resource is not explicitly excluded by the system configuration; 2) ensuring there is a viable method for detecting changes in the content referred to; and 3) ensuring that the resource content is of a Content-Type (or MIME type) that benefits from this type of optimization. If the resource is suitable for optimization, an immutable alias name is created for the resource. In one embodiment, the alias name is generated using a deterministic algorithm that depends on the content it is referencing. Any of a number of well-known algorithms can be used, such as the MD5 hashing algorithm. The alias reference and the actual reference are kept in a data store that is used to map between aliases and actual references. In addition to supplying the alias reference for rewrite step 623, the Resource Optimizer can also provide a method for monitoring the resource for changes. The monitoring logic enables the system to self-correct the affected optimization instruction sets when dependencies change. The monitoring logic may operate, in various embodiments, using a push method in which the operating system that stores the resources fires an event when the resource changes, and/or a polling method in which the resource is periodically checked for changes.

Once a resource reference (link) has been compiled and then encountered in a subsequent response, in rewrite step 623 the original reference is replaced with the alias reference and then written by the Reference Optimizer instruction into the HTTP response stream. Now the client browser always encounters the up-to-date optimized aliased reference. With browser caching instructions optimized in the modified response, the resource will only be downloaded once and is thereafter served from local cache. In some cases the resource will also be smaller in size or of a different, more optimal format than the original.

Resource Preloader Predictive Browser Caching (PBC) Optimizer: Between requests to a web server, there is often a period of time when the user is processing the information presented in response to the previous request. In one embodiment of the present invention, an instruction can be created using the methods described above, such that client-side scripting can be inserted to request resources from the server during this period of idle time, subsequently loading them into the browser's cache. In order to support an automated implementation of this method, user patterns can be analyzed so that the system is able to predict resources that are likely to be next in the user's navigation path, and to load such resources in advance of the user's explicit request for them.

The resulting treatment predictively preloads resources into the client browser's cache, significantly reducing the load times for subsequently requested pages with a minimum of configuration required on the part of the system administrator.

In one embodiment, the PBC Optimizer is implemented using one or more of four distinct functional flows: analysis of user trends; identification of page resources; identification of pages to be treated; and generation and insertion of the preloading script.

Analysis of user trends: In one embodiment, in an implementation where compiler 153 is processing a PBC Optimizer instruction, step 511 (Initiate Pre-Process Event for each Instruction) is performed, prior to token processing, by recording the page that was visited immediately previous to the current page. Based on this recording of the previous page, the PBC Optimizer is able to retain, for the current page, a weighted list of which pages are the most likely to be visited immediately prior to the current page. In this manner, the PBC Optimizer is able to determine which are the best pages for which to preload resources associated with the current page. In one embodiment, this traveled path from one page to the next is linked to a unique user identifier in order to ensure that the journey is tracked on a per-user basis. User-by-user tracking allows the system to track a complete website visitation path rather than just a single connection between one page and the next.

Identification of Page Resources: In one embodiment, step 523 (Analyze & Flag Token for Compilation) is performed by reviewing each token in the page in order to determine whether or not a resource is appropriate for preloading. Any resources identified as such are stored, so that they can be loaded by any pages found likely to precede this page in the user's navigation path.

Identification of Pages to be Treated: In one embodiment, step 417 (Record Request Statistics) is performed by incrementing a hit count for each request, if the referring page is a domain associated with the application being treated. Step 512 (Initialize variables) includes registering a background thread with the system to be run at some interval, which may be configurable. After a specified amount of time has elapsed, the thread is invoked, iterating through the full list of hit counts. Any page having a hit count at or above a threshold (which may be configurable) is identified as a page for which preloading should be performed. For each page that is newly identified for preloading, PBC Optimizer marks each of the page's referring pages that meets a threshold for activity (which may be configurable). In one embodiment, the degree of activity for each page is based on the information gathered in step 511, as described above, specifying which pages are appropriate for preloading. The pages meeting the threshold are then marked for recompilation. Such a technique facilitates preloading of the most heavily-used pages without requiring explicit specification of these pages by an administrator.

Generation and Insertion of the Preloading Script: In one embodiment, step 543 (Compile flagged tokens and instructions into optimization and store translation data) is performed by generating a preloading client-side script for each page that has been identified as a preloading page, as noted in step 512 as part of the identification of pages to be treated. In one embodiment, for each identified page with appropriate usage weights, each resource identified in step 523 is weighted by relevance. Once the entire collection of valid resources has been weighted and correctly filtered according to configurable thresholds, the resources are added to a client-side script designed to invoke server requests for the resources after the originally requested page has completed loading. The fully-specified script is stored in the compiled instruction for later use. Subsequently, if a page is identified as a preloading page and it has a generated script ready for preloading, the entire script is inserted into the requested page in rewrite token step 623. When the requested page has completed loading, the script is invoked and, the resources are requested, in weighted order, from the server and cached by the client.

Response Head Start Instruction:

In one embodiment, a Response Head Start instruction is enabled, which operates to push as much data to the browser as possible prior to the browser getting stalled by complex parsing and rendering. In one embodiment, links that are static are referenced early in the HTML document; references to such links (referred to as "head start" references) are included in a manner that does not affect the visual appearance of the page but still forces the browser to download the content. A mode is enabled, referred to as "chunked-encoding", wherein the server sends HTML code in a series of data chunks; these chunks are then parsed and rendered in sequential order by the browser. When in this mode, the Response Head Start instruction sends the head start references as a single chunk prior to the rest of the page being generated by the server. In this manner, content can be sent to the browser while the server is generating the remainder of the page. This improves efficiency and performance by enabling resources to be loaded during a time when the browser would normally be blocked.

In one embodiment, in an implementation where compiler 153 processes a Response Head Start instruction, step 523 (Analyze & Flag token for compilation) is performed as follows. When optimizer 106 encounters the start of an HTML document in a response, it saves all tokens up to and including the <html> tag. This data is then prepended to the set of links that are identified as head start references and the package is sent to the client as a single chunk.

In one embodiment, step 543 (Compile flagged tokens into optimization and store translation data) is performed as follows. Each instruction type (e.g. CSS consolidator, image consolidator, aliasers, or the like) that is able to take advantage of head start references registers the links with the head start instruction included in the instruction set.

Rewrite step 623 is performed by concatenating the original start of the HTML document up to and including the <html> tag with the list of links registered for head start. This text block is then sent to the browser as a single chunk such that the links are downloaded while the remainder of the HTML page is generated. Subsequently, when the response is ready at the server, the original start is skipped and not sent to the client, since it has already been sent by the Response Head Start instruction. Thus, only one document starting sequence is sent.

JavaScript Deferral Instruction:

In one embodiment of the present invention, an instruction can be created using the methods described above, such that the loading and/or execution of identified JavaScript can be deferred until after the rendering of the page. Such deferral can reduce or eliminate slow, blocking JavaScript execution that otherwise would lengthen the time before the page is displayed to the user.

In one embodiment, in an implementation where compiler 153 processes a JavaScript Deferral instruction, step 523 (Analyze & Flag token for compilation) includes analyzing each token and determining whether or not it represents a JavaScript-related element (referred to as a script element).

In one embodiment, step 542 (Initiate Compile Event for each Instruction in Set) is performed by taking several passes over the identified tokens. In the first pass, tokens are identified for their suitability for deferral; in one embodiment, this identification can be made based on a predefined regular expression pattern. These identified tokens are parsed and an abstract syntax tree is built. Simple data structures for dependency and state are built.

In the second pass, all JavaScript scripts referenced and included in the web page are checked for dependencies from the code identified in the first pass. These dependent pieces of code are also marked for deferral.

Step 623 (Rewrite Token) is performed by analyzing each token and determining if it was one identified in step 542. If so, the instruction replaces the token with a blank. A special block of JavaScript code is created and appended to the end of the web page. This block of JavaScript performs tasks such as fetching any identified deferred resources, as well as executing all dependent code as identified in step 542. In one embodiment, the JavaScript code block is attached to the window.onload event.

Additional Embodiments

The above examples of specific types of HTTP response optimizers is provided for illustrative purposes only, and is not intended to limit the scope of the present invention. As will be apparent to one skilled in the art, other message optimization methodologies can be implemented using the techniques of the present invention.

For example, the present invention can be used to optimize XML web service responses. Requests for web services can be indexed and associated with stored instruction sets compiled using instruction types developed to optimize tokens parsed from XML responses.

As another example, the present invention can be used to optimize messages for display on various client device form factors. The optimizations in this case can be targeted at reorganizing and resizing elements of the response to display best on the client device making each request.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for performing the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method for optimizing a messaging system for communicating between at least one server and at least one client, comprising:
    establishing a threshold representing an amount of data collection to generate at least one optimization instruction set;
    intercepting a plurality of server-originated responses;
    for each of the plurality of intercepted responses:
        making a copy of the response; and
        performing an analysis of the copy of the response to collect data for optimization by at least parsing the copy of the response to derive a plurality of tokens and classify the response-derived tokens into a plurality of predefined token categories;
    responsive to the analysis and when having collected data to reach the established threshold,
        generating at least one optimization instruction set, wherein each of the at least one optimization instruction set is based on a predefined token category from a plurality of predefined token categories having a particular token type, wherein each of the at least one optimization instruction set is generated for at least one content element common to responses associated with at least two users;
        storing the generated at least one optimization instruction set in a storage device; and
        intercepting at least one subsequent response originating at a server; and
    applying the at least one generated optimization instruction set, based on a tokenization of the at least one subsequent response, to modify the at least one subsequent intercepted response so as to improve client performance when rendering the response;
    wherein interception of any response is performed external to its originating server; and
    wherein a timeout condition is established for expiry of at least one stored instruction set, and wherein, responsive to the timeout condition being met for a stored instruction set:
        flagging the stored instruction set as expired;
        initiating analysis of a plurality of copies of responses to collect data for optimization to replace the expired instruction set by at least parsing the copies of the responses to derive a new plurality of tokens and classifying the new responses derived tokens into a plurality of predefined token categories;
        responsive to the analysis having collected data to reach the established threshold, generating a replacement optimization instruction set; and
        storing the generated replacement optimization instruction set.

2. The method of claim 1, wherein the analysis of the copy of the response is performed concurrently with generating and transmitting responses.

3. The method of claim 1, wherein generating the at least one optimization instruction set comprises:
    identifying a plurality of resources to be consolidated; and
    generating instructions for consolidating the identified plurality of resources;
    and wherein the optimization instruction set comprises instructions for replacing the plurality of resources with the consolidated resources.

4. The method of claim 3, wherein identifying a plurality of resources to be consolidated comprises at least one selected from the group consisting of:
    identifying a plurality of cascading style sheet resources to be consolidated;
    identifying a plurality of images to be consolidated; and
    identifying a plurality of JavaScript resources to be consolidated.

5. The method of claim 1, wherein applying the at least one generated optimization instruction set comprises at least one selected from the group consisting of:
    consolidating a plurality of cascading style sheets; consolidating a plurality of images; and
    consolidating a plurality of JavaScript resources.

6. The method of claim 1, wherein applying the at least one generated optimization instruction set comprises rewriting resource references to use a URI stem that increases the number of concurrent connections.

7. The method of claim 1, wherein applying the at least one generated optimization instruction set comprises aliasing references.

8. The method of claim 1, wherein applying the at least one generated optimization instruction set comprises:
    predicting resource usage; and
    preloading at least one resource based on the prediction.

9. The method of claim 1, wherein applying the at least one generated optimization instruction set comprises:
    identifying static links within the subsequent response; and
    transmitting the identified static links to the client prior to rendering of other portions of the subsequent response.

10. The method of claim 1, wherein applying the at least one generated optimization instruction set comprises:
    identifying JavaScript code within the subsequent response; and
    deferring at least one of loading and execution of the identified JavaScript code.

11. The method of claim 1, wherein each response comprises a server response to a request.

12. The method of claim 1, wherein each response comprises a response to an HTTP request.

13. The method of claim 1, wherein performing the analysis of the copy of the response and generating the at least one optimization instruction set are performed at an appliance located in a data path between the server and the client.

14. The method of claim 1, wherein:
    performing the analysis of the copy of the response comprises generating the at least one optimization instruction set comprises compiling instructions for at least one token type.

15. The method of claim 1, wherein performing the analysis of the copy of the response comprises determining at least one portion of the copy of the response that is suitable for optimization.

16. The method of claim 1, further comprising:
    performing additional analysis of a plurality of copies of responses to collect additional data for optimization; and
    modifying at least one previously stored optimization instruction set based on the additional analysis.

17. A system for optimizing a messaging system for communicating between at least one server and at least one client, comprising:
    a computing device, for intercepting a plurality of server-originated responses and for making a copy of each intercepted response;

a compiler, for performing analysis of the copies of the intercepted responses to collect data for optimization, wherein the compiler is further configured to parse a copy of the response to derive a plurality of tokens and classify the response-derived tokens into predefined token categories, and responsive to the analysis and when having collected data to reach an established threshold, generate at least one optimization instruction set, wherein each of the at least one optimization instruction set is based on a predefined token category having a particular token type, wherein generating each of the at least one optimization instruction set is generated for at least one content element common to responses associated with at least two users;

a storage device, coupled to the compiler, for storing the at least one generated optimization instruction set; and a rewriter, coupled to the storage device, for applying the at least one generated optimization instruction set to modify at least one subsequent response originating at a server and intercepted by the computing device, so as to improve client performance when rendering the response;

wherein applying the at least one generated optimization instruction is based on a tokenization of the at least one subsequent response; and wherein interception of any response is performed external to its originating server; and wherein a timeout condition is established for expiry of at least one stored instruction set, and wherein, responsive to the timeout condition being met for a stored instruction set:
  the compiler flags the stored instruction set as expired;
  the compiler initiates analysis of a plurality of copies of responses to collect data for optimization to replace the expired instruction set by at least parsing the copies of the responses to derive a new plurality of tokens and classifying the new responses derived tokens into a plurality of predefined token categories;
  responsive to the analysis having collected data to reach the established threshold, the compiler generates a replacement optimization instruction set; and
  the storage device stores the generated replacement optimization instruction set.

18. The system of claim 17, wherein the compiler generates the at least one optimization instruction set by:
  identifying a plurality of resources to be consolidated; and
  generating instructions for consolidating the identified plurality of resources;
and wherein the at least one optimization instruction set comprises instructions for
  replacing the plurality of resources with the consolidated resources.

19. The system of claim 18, wherein the compiler identifies a plurality of resources to be consolidated by performing at least one selected from the group consisting of:
  identifying a plurality of cascading style sheet resources to be consolidated;
  identifying a plurality of images to be consolidated; and
  identifying a plurality of JavaScript resources to be consolidated.

20. The system of claim 17, wherein the rewriter applies the at least one generated optimization instruction set by performing at least one selected from the group consisting of:
  consolidating a plurality of cascading style sheets; consolidating a plurality of images; and
  consolidating a plurality of JavaScript resources.

21. The system of claim 17, wherein the rewriter applies the at least one generated optimization instruction set by rewriting resource references to use a URI stem that increases the number of concurrent connections.

22. The system of claim 17, wherein the rewriter applies the at least one generated optimization instruction set by aliasing references.

23. The system of claim 17, wherein the rewriter applies the at least one generated optimization instruction set by:
  predicting resource usage; and
  preloading at least one resource based on the prediction.

24. The system of claim 17, wherein the rewriter applies the at least one generated optimization instruction set by:
  identifying static links within the subsequent response; and
  transmitting identified static links to the client prior to rendering of other portions of the subsequent response.

25. The system of claim 17, wherein the rewriter applies the at least one generated optimization instruction set by:
  identifying JavaScript code within the subsequent response; and
  deferring at least one of loading and execution of identified JavaScript code.

26. The system of claim 17, wherein each response comprises a server response to a request.

27. The system of claim 17, wherein each response comprises a response to an HTTP request.

28. The system of claim 17, wherein the compiler is a component of an appliance located in a data path between the server and the client.

29. The system of claim 17, wherein:
  the compiler performs analysis by parsing the copies of the responses to derive a plurality of response-derived tokens and classifying the response-derived tokens according to type; and
  the compiler generates the at least one optimization instruction set by compiling instructions for at least one associated token type.

30. The system of claim 17, wherein the compiler performs analysis by, for at least one response, determining at least one portion of the copy of the response that is suitable for optimization.

31. The system of claim 17, wherein the compiler:
  performs additional analysis of a plurality of copies of responses to collect additional data for optimization; and
  modifies at least one previously stored the at least one optimization instruction set based on the additional analysis.

32. A computer program product for optimizing a messaging system for communicating between at least one server and at least one client, comprising:
  a non-transitory computer-readable storage medium; and
  computer program code, encoded on the medium, for:
    establishing a threshold representing an amount of data collection to generate at least one optimization instruction set;
    intercepting a plurality of server-originated responses
    for each of the plurality of intercepted responses:
      making a copy of the response; and
      performing analysis of the copy of the response to collect data for optimization by at least parsing the copy of the response to derive a plurality of tokens and classifying the response-derived tokens into a plurality of predefined token categories;
    responsive to the analysis and when having collected data to reach the established threshold, generating at least one optimization instruction set, wherein each of the at least one optimization instruction set is based on a predefined token category from a plurality of predefined token categories having a particular token type, wherein each of the at least one optimization instruction set is generated for at least one content element common to responses associated with at least two users;

storing the at least one generated optimization instruction set in a storage device;

intercepting at least one subsequent response originating at a server; and applying the at least one generated optimization instruction set, based on a tokenization of the at least one subsequent response, to modify the at least one subsequent intercepted response so as to improve client performance when rendering the response wherein interception of any response is performed external to its originating server; and wherein a timeout condition is established for expiry of at least one stored instruction set, and wherein, responsive to the timeout condition being met for a stored instruction set:

flagging the stored instruction set as expired;

initiating analysis of a plurality of copies of responses to collect data for optimization to replace the expired instruction set by at least parsing the copies of the responses to derive a new plurality of tokens and classifying the new responses derived tokens into a plurality of predefined token categories;

responsive to the analysis having collected data to reach the established threshold, generating a replacement optimization instruction set; and storing the generated replacement optimization instruction set.

33. The computer program product of claim 32, wherein the computer program code causes the analysis of the copy of the response to be performed concurrently with generating and transmitting responses.

34. The computer program product of claim 32, wherein the computer program code for generating the at least one optimization instruction set comprises computer program code for:

identifying a plurality of resources to be consolidated; and generating instructions for consolidating the identified plurality of resources;

and wherein the at least one optimization instruction set comprises instructions for replacing the plurality of resources with the consolidated resources.

35. The computer program product of claim 34, wherein the computer program code for identifying a plurality of resources to be consolidated comprises computer program code for performing at least one selected from the group consisting of:

identifying a plurality of cascading style sheet resources to be consolidated;

identifying a plurality of images to be consolidated; and identifying a plurality of JavaScript resources to be consolidated.

36. The computer program product of claim 32, wherein the computer program code for applying the generated at least one optimization instruction set comprises computer program code for performing at least one selecting from the group consisting of:

consolidating a plurality of cascading style sheets;

consolidating a plurality of images; and consolidating a plurality of JavaScript resources.

37. The computer program product of claim 32, wherein the computer program code for applying the generated at least one optimization instruction set comprises computer program code for rewriting resource references to use a URI stem that increases the number of concurrent connections.

38. The computer program product of claim 32, wherein the computer program code for applying the generated at least one optimization instruction set comprises computer program code for aliasing references.

39. The computer program product of claim 32, wherein the computer program code for applying the generated at least one optimization instruction set comprises computer program code for:

predicting resource usage; and preloading at least one resource based on the prediction.

40. The computer program product of claim 32, wherein the computer program code for applying the generated at least one optimization instruction set comprises computer program code for:

identifying static links within the subsequent response; and transmitting the identified static links to the client prior to rendering of other portions of the subsequent response.

41. The computer program product of claim 32, wherein the computer program code for applying the generated at least one optimization instruction set comprises computer program code for:

identifying JavaScript code within the subsequent response; and deferring at least one of loading and execution of identified JavaScript code.

42. The computer program product of claim 32, wherein each response comprises a server response to a request.

43. The computer program product of claim 32, wherein each response comprises a response to an HTTP request.

44. The computer program product of claim 32, wherein:

the computer program code for performing the analysis of the copy of the response comprises: computer program code for parsing the copy of the response to derive the plurality of tokens and classifying the response-derived tokens into a plurality of predefined token categories; and the computer program code for generating an optimization instruction set comprises: computer program code for compiling instructions for at least one token type.

45. The computer program product of claim 32, wherein the computer program code for performing the analysis of the copy of the response comprises computer program code for determining at least one portion of the copy of the response that is suitable for optimization.

46. The computer program product of claim 32, further comprising computer program code for:

performing additional analysis of a plurality of copies of responses to collect additional data for optimization; and modifying at least one previously stored optimization instruction set based on the additional analysis.

47. The method of claim 1, wherein each predefined token category from a plurality of predefined token categories having a particular token type is based on a content-type of an intercepted response.

* * * * *